(12) United States Patent
Jeon et al.

(10) Patent No.: US 11,226,823 B2
(45) Date of Patent: Jan. 18, 2022

(54) MEMORY MODULE AND OPERATING METHOD THEREOF

(71) Applicant: SAMSUNG ELECTRONICS CO., LTD., Suwon-si (KR)

(72) Inventors: Younho Jeon, Gimhae-si (KR); Youngjin Cho, Seoul (KR); Hee Hyun Nam, Seoul (KR); Hyo-Deok Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 16/879,120

(22) Filed: May 20, 2020

(65) Prior Publication Data

US 2021/0081204 A1 Mar. 18, 2021

(30) Foreign Application Priority Data

Sep. 18, 2019 (KR) .................. 10-2019-0114889

(51) Int. Cl.
*G06F 9/30* (2018.01)
*G06F 1/12* (2006.01)
*G06K 9/62* (2006.01)
*G06F 12/02* (2006.01)
*G06F 9/54* (2006.01)
*G06F 1/08* (2006.01)

(52) U.S. Cl.
CPC ............ *G06F 9/30189* (2013.01); *G06F 1/08* (2013.01); *G06F 1/12* (2013.01); *G06F 9/30101* (2013.01); *G06F 9/544* (2013.01); *G06F 12/0246* (2013.01); *G06K 9/6257* (2013.01); *G06F 2212/7211* (2013.01)

(58) Field of Classification Search
CPC ..... G06K 9/6257; G06F 9/30189; G06F 1/12; G06F 12/0246
See application file for complete search history.

(56) References Cited

U.S. PATENT DOCUMENTS

| 7,647,467 | B1 * | 1/2010 | Hutsell ............... G06F 13/4239 711/170 |
| 8,688,901 | B2 | 4/2014 | Chiu et al. |
| 9,015,408 | B2 | 4/2015 | Amer et al. |
| 9,449,651 | B2 | 9/2016 | Takefman et al. |
| 9,640,236 | B2 | 5/2017 | Sun et al. |
| 9,753,651 | B2 | 9/2017 | Choi |
| 10,185,499 | B1 | 1/2019 | Wang et al. |

(Continued)

*Primary Examiner* — Zachary K Huson
(74) *Attorney, Agent, or Firm* — F. Chau & Associates, LLC

(57) ABSTRACT

A memory module includes a device controller that communicates with a host device based on a first interface including a first clock signal, a first data signal, and a first data strobe signal and operates in one of a first operation mode or a second operation mode depending on an operation mode control value from the host device, and a memory device that communicates with the device controller based on a second interface including a second data signal and a second data strobe signal. The device controller includes a logic circuit that transmits a predetermined training result value to the host device depending on a training control value from the host device, when a training is performed on a third interface being a virtual interface recognized by the host device in the first operation mode.

20 Claims, 15 Drawing Sheets

(56) References Cited

U.S. PATENT DOCUMENTS

| | | | |
|---|---|---|---|
| 10,261,697 B2 | 4/2019 | Lee et al. | |
| 2014/0195728 A1* | 7/2014 | Hsu | G06F 1/12 |
| | | | 711/105 |
| 2016/0314822 A1* | 10/2016 | Yeung | G11C 5/02 |
| 2018/0059933 A1* | 3/2018 | Helmick | G06F 3/061 |

* cited by examiner

| MODE | TMV |
|------|-----|
| MRE(P) | TCV_A |
| DWL | TCV_B |
| MRD1 | TCV_C |
| MRD2 | TCV_D |
| MRD3 | TCV_E |
| MWD1 | TCV_F |
| MWD2 | TCV_G |
| MPR | ED |
| TSW | CR |

MEMORY MODULE AND OPERATING METHOD THEREOF

CROSS-REFERENCE TO RELATED APPLICATIONS

This U.S. non-provisional patent application claims priority under 35 U.S.C. § 119 to Korean Patent Application No. 10-2019-0114889 filed on Sep. 18, 2019, in the Korean Intellectual Property Office, the disclosure of which is incorporated by reference herein in its entirety.

BACKGROUND

1. Technical Field

Embodiments of the inventive concept disclosed herein relate to a semiconductor device, and more particularly, relate to a memory module supporting an interface training operation that is performed by a host.

2. Discussion of Related Art

A computing system includes a main memory for temporarily storing data that a processor uses. The main memory is manufactured to operate in compliance with standards such as a dual in-line memory module (DIMM), a registered DIMM (RDIMM), and a load reduced DIMM (LRDIMM). A memory module of an LRDIMM type includes a data buffer. However, a memory module of an RDIMM type does not include the data buffer.

The data buffer of the memory module of the LRDIMM type may be mounted on a printed circuit board to occupy a partial area of the printed circuit board. Accordingly, only a limited number of memory devices can be mounted on the printed circuit board. Also, a latency may additionally occur in read and write operations performed on a memory module of the LRDIMM type because data is read or written through the data buffer.

SUMMARY

At least one exemplary embodiment of the inventive concept provides a memory module capable of operating as an LRDIMM type without including a data buffer.

According to an exemplary embodiment, a memory module includes a device controller that communicates with a host device based on a first interface including a first clock signal, a first data signal, and a first data strobe signal and operates in one of a first operation mode or a second operation mode depending on an operation mode control value from the host device, and a memory device that communicates with the device controller based on a second interface including a second data signal and a second data strobe signal. The device controller includes a logic circuit that transmits a predetermined training result value to the host device depending on a training control value from the host device, when a training is performed on a third interface being a virtual interface recognized by the host device in the first operation mode.

According to an exemplary embodiment, an operating method of a memory module which includes a device controller and a memory device includes performing an initialization operation in one of a first operation mode or a second operation mode depending on an operation mode control value from a host device, receiving, from the host device, a training mode enable signal for training a virtual interface between the memory device and a virtual data buffer recognized by the host device as being included in the memory module, after the initialization operation is performed in the first operation mode, receiving a training control value corresponding to a delay value of the virtual interface from the host device, after the training mode enable signal is received, and transmitting a predetermined training result value to the host device depending on the received training control value.

According to an exemplary embodiment, a memory module includes a device controller that communicates with a host device based on a first interface, and a memory device that communicates with the device controller based on a second interface. When a first training operation is performed on the first interface by the host device, the device controller transmits a training result value obtained depending on the first training operation to the host device. When a second training operation is performed on a third interface being a virtual interface by the host device, the device controller transmits a predetermined training result value to the host device.

BRIEF DESCRIPTION OF THE FIGURES

The inventive concept will become apparent by describing in detail exemplary embodiments thereof with reference to the accompanying drawings.

FIG. 6 illustrates an example of a control register of FIG. 5.

DETAILED DESCRIPTION OF THE EXEMPLARY EMBODIMENTS

Below, embodiments of the inventive concept are described in detail and clearly to such an extent that one of ordinary skill in the art can implements the inventive concept.

In the specification, an "interface" between two devices means signals exchanged between the two devices and signals used to exchange the signals. For example, an interface may include a data signal, a data strobe signal, a clock signal, etc.

In the specification, "interface training" means an operation of selecting an optimized delay value obtained by adjusting a delay value (i.e., a phase or a timing value) of signals exchanged between two devices and signals used to exchange the signals.

Figure 1:
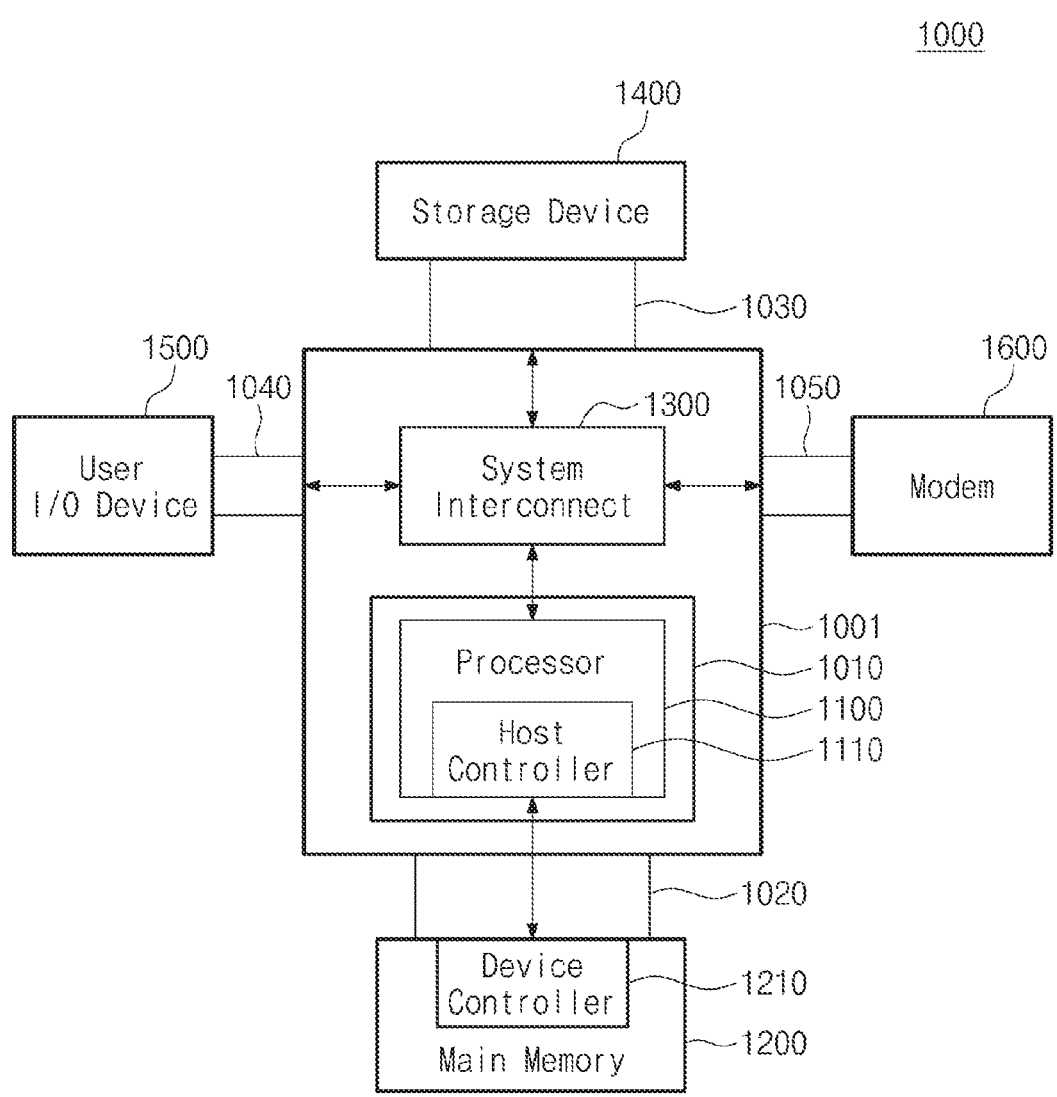
FIG. 1 is a block diagram illustrating a computing system according to an exemplary embodiment of the inventive concept.

FIG. 1 is a block diagram illustrating a computing system according to an exemplary embodiment of the inventive concept. Referring to FIG. 1, a computing system 1000 includes a substrate 1001, a processor 1100, a main memory 1200, a system interconnect 1300, a storage device 1400, a user input/output device 1500, and a modem 1600.

The substrate 1001 may be a mother board or a printed circuit board on which the processor 1100, the main memory 1200, the system interconnect 1300, the storage device 1400, the user input/output device 1500, and the modem 1600 are mounted. The substrate 1001 may include first to fifth connectors 1010 to 1050 on which the processor 1100, the main memory 1200, the storage device 1400, the user input/output device 1500, and the modem 1600 are mounted. The connectors 1010 to 1050 may be conductive pads. The substrate 1001 may be manufactured to include the system interconnect 1300.

The processor 1100 may include a central processing unit (CPU) or an application processor that controls the computing system 1000 and performs various operations. The processor 1100 may include a host controller 1110 (e.g., a control circuit) configured to control the main memory 1200. The processor 1100 may store codes (e.g., executable codes) necessary to perform operations in the main memory 1200. The operations may generate data, write data and read written data.

The main memory 1200 may be connected to the substrate 1001 through the second connector 1020. The main memory 1200 may include a dynamic random access memory (DRAM). The main memory 1200 may be a storage class memory (SCM) including a nonvolatile memory such as a flash memory or a phase change memory. The main memory 1200 may be based on a dual in-line memory module (DIMM).

The main memory 1200 may include a device controller 1210 (e.g., a control circuit). The device controller 1210 may control the main memory 1200 based on a command provided from the host controller 1110. For example, the device controller 1210 may write data in a memory device included in the main memory 1200 or may read data from the memory device.

The system interconnect 1300 may provide communication channels between the processor 1100, the storage device 1400, the user input/output device 1500, and the modem 1600. The system interconnect 1300 may be based on one of various standards such as Peripheral Component Interconnect express (PCIe), Nonvolatile Memory express (NVMe), Advanced eXtensible Interface (AXI), and ARM Microcontroller Bus Architecture (AMBA).

The storage device 1400 may be connected to the substrate 1001 through the third connector 1030. The storage device 1400 may function as a secondary memory of the computing system 1000. The storage device 1400 may store an operating system and an application driven by the processor 1100 and original data of user data. The storage device 1400 may include a hard disk drive (HDD), a solid state drive (SSD), an optical disk drive (ODD), etc.

The user input/output device 1500 may be connected to the substrate 1001 through the fourth connector 1040. The user input/output device 1500 may be configured to exchange information with a user. The user input/output device 1500 may include user input devices, which are able to receive information from the user, such as a keyboard, a mouse, a touch panel, an operation sensor, and a microphone. The user input/output device 1500 may include user output devices, which are able to provide information to the user, such as a display device, a speaker, a beam projector, and a printer.

The modem 1600 may be connected to the substrate 1001 through the fifth connector 1050. The modem 1600 may be configured to exchange data with an external device wiredly or wirelessly. In an exemplary embodiment, the modem 1600 may be integrated with the substrate 1001 or the processor 1100.

Figure 2:
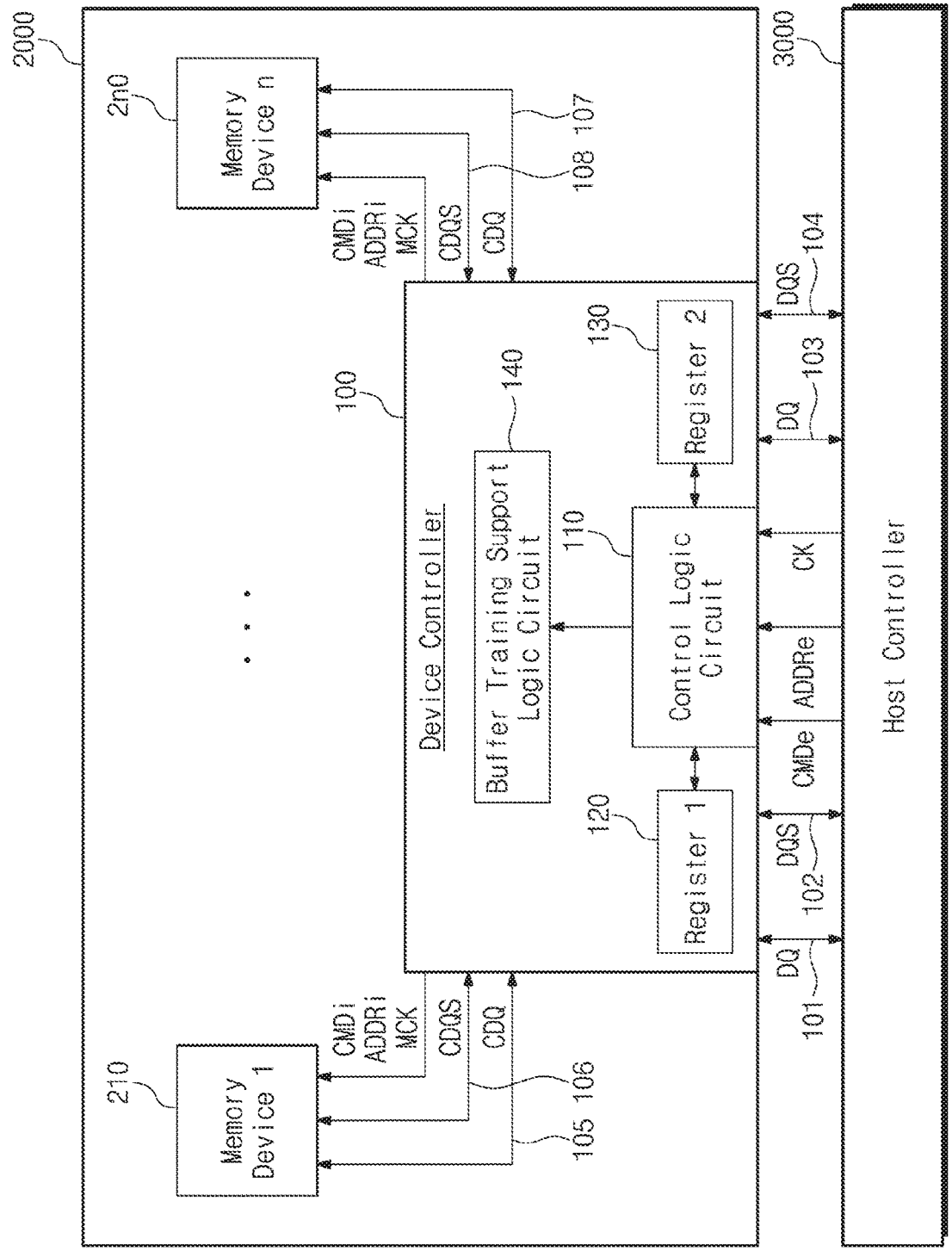
FIG. 2 is a block diagram illustrating a memory module according to an exemplary embodiment of the inventive concept.

FIG. 2 is a block diagram illustrating a memory module according to an exemplary embodiment of the inventive concept. A memory module 2000 and a host controller 3000 of FIG. 2 may correspond to the main memory 1200 and the host controller 1110 of FIG. 1, respectively.

Referring to FIG. 2, the memory module 2000 includes a device controller 100 and a plurality of memory devices 210 to 2n0. The device controller 100 and the memory devices 210 to 2n0 may be implemented with different semiconductor packages and may be mounted on one printed circuit board. For example, the number of memory devices 210 to 2n0 may be 9, but the inventive concept is not limited thereto.

The device controller 100 communicates with the host controller 3000 through a host interface. The host interface may include signals that are exchanged between the device controller 100 and the host controller 3000. For example, the host interface may include a data signal DQ and a data strobe signal DQS.

The device controller 100 may receive a command CMDe, an address ADDRe, a clock signal CK, the data signal DQ, and the data strobe signal DQS from the host controller 3000. In an exemplary embodiment, the device controller 100 latches a level of the data signal DQ based on a transition timing of the data strobe signal DQS. For example, the device controller 100 may latch a level of the data signal DQ each time the data strobe signal DQS transitions from one logic level to a different logic level. A signal that the device controller 100 receives from the host controller 3000 is not limited thereto, and the device controller 100 may receive various signals (e.g., control signals) from the host controller 3000. The device controller 100 may transmit the data signal DQ and the data strobe signal DQS to the host controller 3000.

The device controller 100 may communicate with the memory devices 210 to $2n0$ based on a controller interface. The controller interface may include signals that are exchanged between the device controller 100 and the memory devices 210 to $2n0$. For example, the controller interface may include a data signal CDQ and a data strobe signal CDQS.

The device controller 100 may transmit a command CMDi, an address ADDRi, a clock signal MCK, the data signal CDQ, and the data strobe signal CDQS to each of the memory devices 210 to $2n0$. The device controller 100 may receive the data signal CDQ and the data strobe signal CDQS from each of the memory devices 210 to $2n0$. In an exemplary embodiment, the device controller 100 latches a level of the data signal CDQ based on a transition timing of the data strobe signal CDQS. For example, the device controller 100 may latch a level of the data signal CDQ each time the data strobe signal CDQS transitions from one logic level to a different logic level.

The device controller 100 may transmit the command CMDi, the address ADDRi, and the clock signal MCK to at least one of the memory devices 210 to $2n0$ in response to the command CMDe, the address ADDRe, and the clock signal CK transmitted from the host controller 3000. The device controller 100 may transmit the command CMDi, the address ADDRi, and the clock signal MCK to at least one of the memory devices 210 to $2n0$ in response to a selection signal from the host controller 3000.

The device controller 100 may transmit the data signal CDQ and the data strobe signal CDQS to a relevant memory device based on the data signal DQ and the data strobe signal DQS. For example, the device controller 100 may transmit the data signal CDQ and the data strobe signal CDQS to the first memory device 210 through a fifth signal line 105 and a sixth signal line 106, based on the data signal DQ and the data strobe signal DQS respectively received through a first signal line 101 and a second signal line 102. The device controller 100 may transmit the data signal CDQ and the data strobe signal CDQS to the n-th memory device $2n0$ through a seventh signal line 107 and an eighth signal line 108, based on the data signal DQ and the data strobe signal DQS respectively received through a third signal line 103 and a fourth signal line 104.

In an exemplary embodiment, the device controller 100 transmits the data signal DQ transmitted from the host controller 3000 to a memory device without modification. In this case, a value of the data signal DQ may be identical to a value of the data signal CDQ transmitted from the device controller 100 to a memory device. In another embodiment, the device controller 100 processes the data signal DQ transmitted from the host controller 3000 to generate a processed data signal and transmits the processed data signal to a memory device. In this case, a value of the data signal DQ may be different from a value of the data signal CDQ transmitted from the device controller 100 to a memory device.

Based on the command CMDi and the address ADDRi, the device controller 100 may read the data signal CDQ from each of the memory devices 210 to $2n0$ or may write the data signal CDQ in each of the memory devices 210 to $2n0$. For example, when the command CMDi is a read command, the device controller 100 may receive the data signal CDQ from one of the memory devices 210 to $2n0$ indicated by the address ADDRi or from a location within one of the memory devices 210 to $2n0$ indicated by the address ADDRi.

In response to the command CMDi and the address ADDRi, each of the memory devices 210 to $2n0$ may output the data signal CDQ from internal memory cells or may store the data signal CDQ in the internal memory cells. To output the data signal CDQ, each of the memory devices 210 to $2n0$ may transmit the data signal CDQ and the data strobe signal CDQS to the device controller 100. To store the data signal CDQ, each of the memory devices 210 to $2n0$ may receive the data signal CDQ and the data strobe signal CDQS from the device controller 100. In an exemplary embodiment, each of the memory devices 210 to $2n0$ latches a level of the data signal CDQ based on a transition timing of the data strobe signal CDQS. For example, each of the memory devices 210 to $2n0$ may latch a level of the data signal CDQ each time a transition of the data strobe signal CDQS occurs.

Each of the memory devices 210 to $2n0$ may operate based on the clock signal MCK. For example, each of the memory devices 210 to $2n0$ may generate the data strobe signal CDQS from the clock signal MCK.

Each of the memory devices 210 to $2n0$ may be a volatile memory such as a DRAM, or a nonvolatile memory such as a flash memory, a PRAM, an RRAM, or an MRAM.

The device controller 100 includes a control logic circuit 110, a first register 120, a second register 130, and a buffer training support logic circuit 140. In an exemplary embodiment, the control logic circuit 110 stores a control value associated with an operation of the device controller 100 in the first register 120 in response to the command CMDe and the address ADDRe. The device controller 100 may operate depending on the control value stored in the first register 120. For example, the device controller 100 may operate in a first operation mode or a second operation mode depending on the control value stored in the first register 120. That is, the device controller 100 may operate in an operation mode selected by the host controller 3000 from among the first operation mode and the second operation mode. For example, the control value may be set to a first value to select the first operation mode and set to a second other value to select a second operation mode.

In an exemplary embodiment, the first operation mode refers to a mode of operating in compliance with the LRDIMM standard, and the second operation mode refers to a mode of operating in compliance with the RDIMM standard. In the case where the device controller operates in the first operation mode, the memory module 2000 may be recognized as a memory module of the LRDIMM type by the host controller 3000. In the case where the device controller (e,g., 100) operates in the second operation mode, the memory module 2000 may be recognized as a memory module of the RDIMM type by the host controller 3000. That is, the memory module 2000 may operate as the LRDIMM or the RDIMM depending on a control value received from the host controller 3000.

Figure 3:
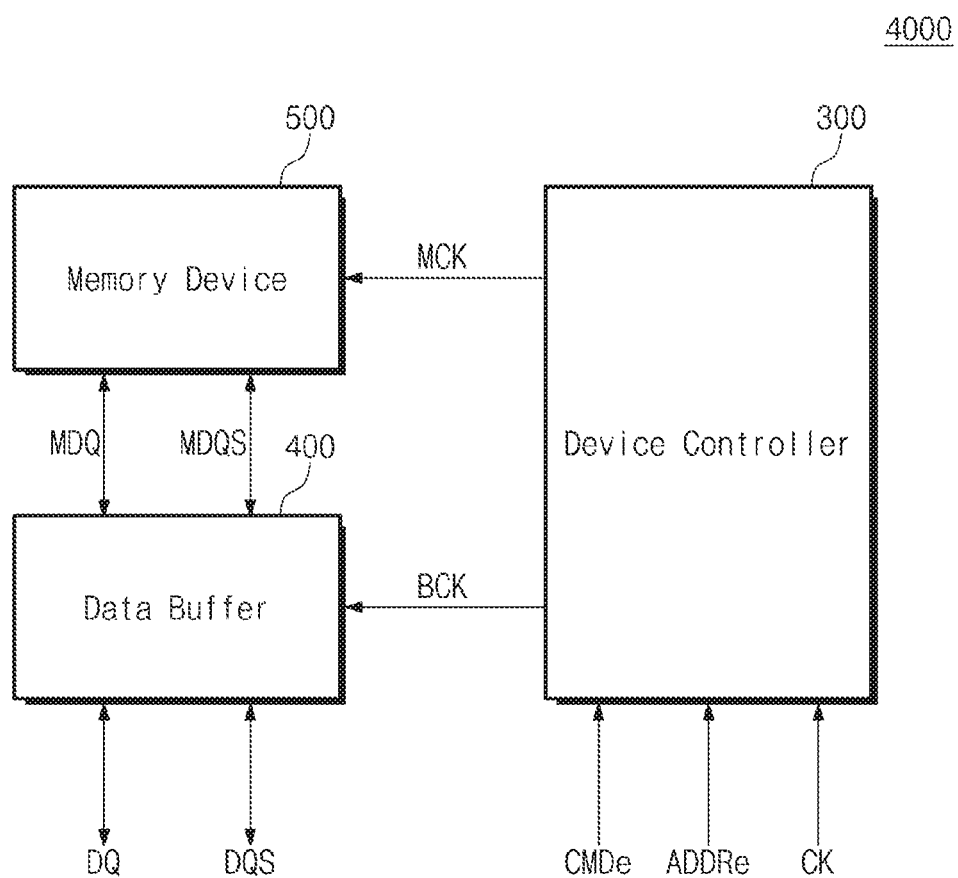
FIG. 3 is a block diagram illustrating an example of a memory module recognized by a host controller when a memory module of FIG. 2 operates in a first operation mode.

In the case where the memory module 2000 operates in the first operation mode, as illustrated in FIG. 3, the host controller 3000 may recognize that the memory module 2000 includes a data buffer corresponding to each of the memory devices 210 to $2n0$.

FIG. 3 is a block diagram illustrating an example of a memory module recognized by a host controller (e.g., 3000) when a memory module of FIG. 2 operates in a first operation mode. Referring to FIG. 3, the host controller 3000 may recognize that a memory module 4000 includes a device controller 300, a data buffer 400, and a memory device 500. In this case, the device controller 300 may receive the command CMDe, the address ADDRe, and the clock signal CK.

The host controller 3000 may recognize that the data buffer 400 and the memory device 500 communicate based on a memory interface. In this case, the memory interface may include first signals exchanged between the data buffer 400 and the memory device 500 and second signals used to exchange the first signals. For example, the memory interface may include a data signal MDQ, a data strobe signal MDQS, and a clock signal BCK.

The host controller 3000 may recognize that the data buffer 400 receives the data signal DQ and the data strobe signal DQS and operates based on the clock signal BCK provided from the device controller 300. In this case, it may be recognized that the clock signal BCK is generated based on the clock signal CK. The host controller 3000 may recognize that the data buffer 400 transmits the data signal MDQ and the data strobe signal MDQS to the memory device 500 based on the data signal DQ and the data strobe signal DQS. The host controller 3000 may recognize that the data buffer 400 receives the data signal MDQ and the data strobe signal MDQS from the memory device 500.

The host controller 3000 may recognize that the memory device 500 receives the data signal MDQ and the data strobe signal MDQS from the data buffer 400 and transmits the data signal MDQ and the data strobe signal MDQS to the data buffer 400. In this case, it may be recognized that the memory device 500 operates based on the clock signal MCK provided from the device controller 300 and the clock signal MCK is generated based on the clock signal CK.

As such, in the case where the memory module 2000 operates in the first operation mode, the host controller 3000 may recognize that the memory module 2000 operates as the memory module 4000 even though the memory module 2000 does not actually include a data buffer. In this case, the host controller 3000 may recognize that the data buffer 400 and the memory device 500 communicate based on a memory interface. That is, the data buffer 400 may be a virtual data buffer that is recognized by the host controller 3000 as being included in the memory module 2000. Accordingly, the memory interface may be a virtual interface between the virtual data buffer 400 and the memory device 500.

Since the memory module 2000 is recognized as the memory module 4000 by the host controller 3000, the host controller 3000 may recognize that both the host interface and the memory interface exist. For example, the host controller 3000 may recognize that a data signal DQ, a data strobe signal DQS, a data signal MDQ, a data strobe signal MDQS, and a clock signal BCK all need to be generated. As such, the host controller 3000 may perform a host interface training operation and a memory interface training operation. The host controller 3000 may perform an interface training operation before the memory module 2000 performs a normal operation. Examples of the normal operation may include a read operation and a write operation.

Returning to FIG. 2, because the memory module 2000 does not include a data buffer, a host interface may be present between the memory module 2000 and the host controller 3000, but a memory interface may fail to exist between a data buffer and a memory device (i.e., the memory interface being a virtual interface). That is, the memory module 2000 may perform the host interface training operation but may fail to perform the memory interface training operation. For the memory module 2000 to operate in the first operation mode, the memory interface training operation may be normally performed by the host controller 3000. As such, the memory module 2000 may replicate the memory interface training operation (i.e., does not actually perform the memory interface training operation). The host controller 3000 may recognize that the memory interface training operation is normally performed depending on a training replica operation of the memory module 2000.

The control logic circuit 110 receives the command CMDe and the address ADDRe for the memory interface training operation from the host controller 3000. In an exemplary embodiment, the control logic circuit 110 provides a training control value to the buffer training support logic circuit 140 based on the received command CMDe and the received address ADDRe. The buffer training support logic circuit 140 may generate a predetermined training result value depending on the provided training control value and may transmit the generated training result value to the host controller 3000 through the data signal DQ. That is, the buffer training support logic circuit 140 may replicate the memory interface training operation by transmitting the predetermined training result value to the host controller 3000. For example, instead of performing the memory interface training operation to generate an actual training result value, the buffer training support logic circuit 140 transmits a predetermined training result value to the host controller 3000.

The host controller 3000 may select a final delay value (i.e., a final phase value or a final timing value) of the memory interface based on the training result value. For example, the host controller 3000 may select a final delay value of the data strobe signal MDQS from the data buffer 400 of FIG. 3. The host controller 3000 may provide the selected final delay value to the memory module 2000. The control logic circuit 110 may store the final delay value in the buffer training support logic circuit 140. As such, the host controller 3000 may recognize that the memory interface training operation has normally completed. For example, instead of receiving an error message or signal indicating that the memory interface training operation could not be performed due to lack of a data buffer, the host controller 3000 receives a valid predetermined training result value. The training replica operation that is performed based on the buffer training support logic circuit 140 will be more fully described with reference to FIGS. 5 to 11.

The device controller 100 may receive the command CMDe and the address ADDRe for the host interface training operation from the host controller 3000. The device controller 100 actually performs the host interface training operation based on the received command CMDe and the received address ADDRe. The device controller 100 provides a training result value generated through the training operation to the host controller 3000. The host controller 3000 may select a final delay value of the host interface based on the training result value. The host controller 3000 may store the selected final delay value in an internal register. As such, the host interface training operation may be completed.

In an exemplary embodiment, the buffer training support logic circuit 140 is used for the host interface training operation. The host interface training operation of the device controller 100 will be described with reference to FIGS. 12 to 15.

The device controller 100 may perform a controller interface training operation automatically regardless of a command of the host controller 3000. For example, the control logic circuit 110 may perform the controller interface training operation and may store a final delay value of a controller interface selected through the training operation in the second register 130. As such, the device controller 100 may transmit or receive the data signal CDQ and the data strobe signal CDQS based on the final delay value stored in the second register 130.

The device controller 100 may perform the training operation on the controller interfaces between the memory devices 210 to 2n0 and the device controller 100, respectively. For example, the device controller 100 may train a first controller interface between the first memory device 210 and the device controller 100. The device controller 100 may train an n-th controller interface between the n-th memory device 2n0 and the device controller 100, independently of the first controller interface training operation. As such, the second register 130 may separately store an optimized delay value of the first controller interface and an optimized delay value of the n-th controller interface.

As described above, the memory module 2000 may operate in the first operation mode (i.e., the LRDIMM type) without including a data buffer. In the case where the memory module 2000 has a predetermined size, because the memory module 2000 does not include a data buffer, the number of memory devices to be mounted on the memory module 2000 may increase. Accordingly, the capacity of the memory module 2000 may increase. Also, because data are transferred between the host controller 3000 and the memory devices 210 to 2n0 without using a data buffer, a read latency and a write latency may decrease.

Figure 4:
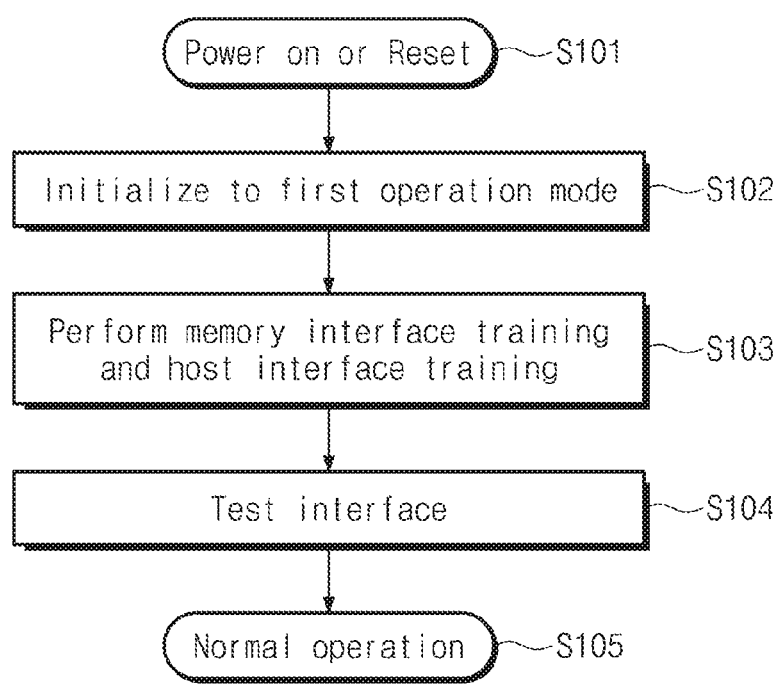
FIG. 4 is a flowchart illustrating an exemplary operation of a memory module of FIG. 2 according to an exemplary embodiment of the inventive concept.

FIG. 4 is a flowchart illustrating an exemplary operation of a memory module of FIG. 2 according to an exemplary embodiment of the inventive concept. Referring to FIGS. 2 and 4, in operation S101, the memory module 2000 may be powered on or reset. The reset may occur after the memory module 2000 is powered on. In operation S102, the memory module 2000 is initialized to a first operation mode. For example, in the initialization operation, the host controller 3000 may select the first operation mode among the first operation mode and the second operation mode. As such, the memory module 2000 may perform an initialization operation according to the first operation mode thus selected.

In operation S103, the memory module 2000 performs the memory interface training operation and the host interface training operation. The memory interface training operation and the host interface training operation may be controlled by the host controller 3000. The memory module 2000 may perform the training operation based on a command or a training control value transmitted from the host controller 3000. In an exemplary embodiment, final delay values of a memory interface are selected by the host controller 3000 through the memory interface training operation. In an exemplary embodiment, final delay values of a host interface are selected by the host controller 3000 through the host interface training operation.

After the training operations in operation S103 have completed, in operation S104, the memory module 2000 tests the trained interface. An interface test operation used to test the trained interface may be controlled by the host controller 3000. The host controller 3000 may determine whether the interface training operations are normally performed depending on the interface test operation.

After the test operation has completed, in operation S105, the memory module 2000 performs a normal operation. In the normal operation, the memory module 2000 may communicate with the host controller 3000 and the memory devices 210 to 2n0 based on the host interface and the controller interface. The controller interface training operation may be separately performed by the memory module 2000. In the normal operation, the memory module 2000 does not use final delay values selected through the memory interface training operation.

The memory interface training operation of the memory module 2000 will be more fully described with reference to FIGS. 5 to 11.

Figure 5:
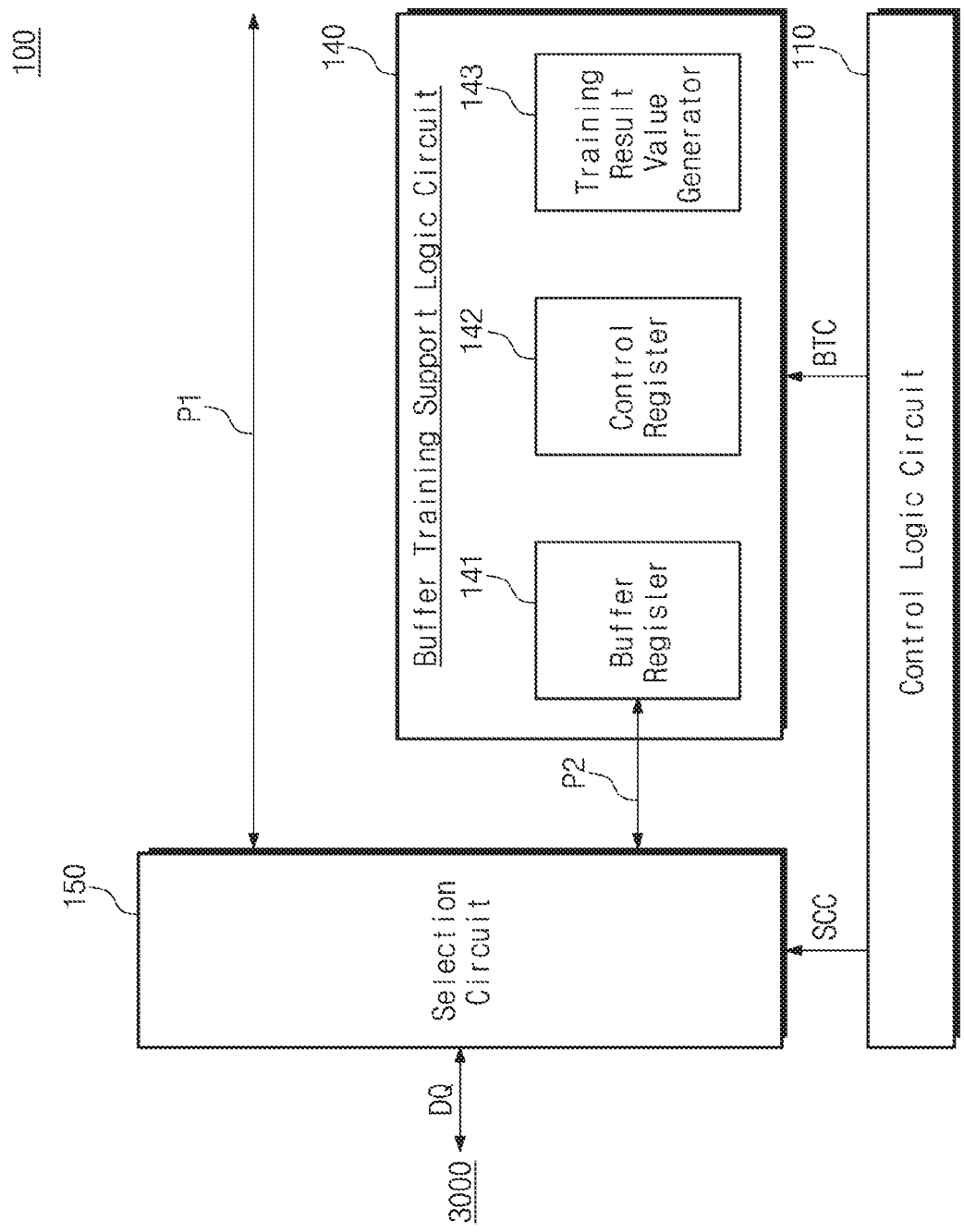
FIG. 5 is a block diagram illustrating an example of a device controller of FIG. 2 for performing a memory interface training operation according to an exemplary embodiment of the inventive concept.

FIG. 5 is a block diagram illustrating an example of a device controller of FIG. 2 for performing a memory interface training operation according to an exemplary embodiment of the inventive concept. Referring to FIG. 5, the device controller 100 includes the control logic circuit 110, the buffer training support logic circuit 140, and a selection circuit 150. The control logic circuit 110 may control the selection circuit 150 and the buffer training support logic circuit 140 based on the command CMDe and the address ADDRe provided from the host controller 3000.

In an exemplary embodiment, the selection circuit 150 transfers the data signal DQ to one of a first data path P1 or a second data path P2 based on a control signal SCC from the control logic circuit 110. The data signal DQ transferred through the first data path P1 may be provided to a memory device or may be provided to a separate circuit of the device controller 100. The data signal DQ transferred through the second data path P2 is provided to the buffer training support logic circuit 140. Also, the selection circuit 150 may provide the host controller 3000 with the data signal DQ input from one of the first data path P1 or the second data path P2 based on the control signal SCC from the control logic circuit 110.

The control logic circuit 110 may control the selection circuit 150 such that the data signal DQ is transferred to the device controller 100 or the host controller 3000 through the first data path P1 in the normal operation. The control logic circuit 110 may control the selection circuit 150 such that the data signal DQ is transferred to the device controller 100 or the host controller 3000 through the second data path P2 in the memory interface training operation.

The buffer training support logic circuit 140 includes a buffer register 141, a control register 142, and a training result value generator 143. The buffer register 141 may store the data signal DQ transferred through the second data path P2. The data signal DQ stored in the buffer register 141 may be transmitted to the host controller 3000 through the second data path P2.

The control register 142 may store a training control value associated with the memory interface training operation. The control logic circuit 110 may receive the training control value based on the command CMDe and the address ADDRe from the host controller 3000. The control logic circuit 110 may store the training control value received through a control signal BTC in the control register 142. The control logic circuit 110 may store the training control value in a location of the control register 142 indicated by the address ADDRe.

The training result value generator 143 may generate a predetermined training result value based on the training control value stored in the control register 142. The predetermined training result value may correspond to an actual training result value that is obtained through a training operation performed on an actual memory interface. That is, the predetermined training result value may be a replica value associated with the actual training result value. For example, the predetermined training result value may be generated depending on a particular algorithm such that the memory interface training operation is normally completed or may be stored in advance as a particular value. The generated training result value may be transmitted to the host controller 3000 through the buffer register 141.

As described above, in the memory interface training operation, the buffer training support logic circuit 140 replicates the memory interface training operation by generating the predetermined training result value depending on the training control value. As such, the memory interface training operation that is performed by the host controller 3000 may be normally completed. Accordingly, the memory module 2000 may operate in the first operation mode without a data buffer.

FIG. 6 illustrates an example of a control register of FIG. 5. Referring to FIGS. 5 and 6, the control register 142 may include a mode field MODE, control fields MRE(P), DWL, MRD (e.g., MRD1, MRD2, MRD3, etc.), and MWD (e.g., MWD1, MWD2, etc.), and data fields MPR and TSW.

The mode field MODE may direct a kind of a training mode. In the memory interface training operation, the mode field MODE may store one of various training modes of the memory interface training operation. For example, the training modes for the memory interface may include a mode (hereinafter referred to as an "MRE(P) training mode") of training a data signal (MDQ) receive enable phase MRE(P), a mode (hereinafter referred to as a "DWL training mode") of training write leveling, a mode (hereinafter referred to as an "MRD training mode") of training a read delay, and a mode (hereinafter referred to as an "MWD training mode") of training a write delay.

In the MRE(P) training mode, there may be selected a final delay value of a receive enable signal that is generated from the clock signal BCK of the data buffer 400 of FIG. 3. The final delay value of the receive enable signal selected in the MRE(P) training mode may be one of delay values that are adjusted within one cycle of the clock signal BCK.

In the DWL training mode, there may be selected a final delay value of the data strobe signal MDQS transmitted from the data buffer 400 of FIG. 3. The final delay value of the data strobe signal MDQS selected in the DWL training mode may be one of a plurality of delay values that are adjusted within one cycle of the data strobe signal MDQS.

In the MRD training mode, there may be selected a final delay value of the receive enable signal and a final delay value of the data strobe signal MDQS and the data signal MDQ received from the memory device 500 of FIG. 3. The final delay value of the receive enable signal selected in the MRD training mode may be one of a plurality of multiples of one cycle of the clock signal BCK. That is, a delay may be selected in units of a cycle of the receive enable signal. The final delay value of the data strobe signal MDQS and the data signal MDQ selected in the MRD training mode may be one of delay values that are adjusted within one cycle of the data strobe signal MDQS.

In the MWD training mode, there may be selected a final delay value of the data strobe signal MDQS and the data signal MDQ transmitted from the data buffer 400 of FIG. 3. The final delay value of the data strobe signal MDQS selected in the MWD training mode may be one of a plurality of multiples of one cycle of the data strobe signal MDQS. That is, a delay may be selected in units of a cycle of the data strobe signal MDQS. The final delay value of the data signal MDQ selected in the MWD training mode may be one of a plurality of delay values that are adjusted within one cycle of the data strobe signal MDQS.

Below, for convenience of description, a final delay value selected within one cycle is referred to as a "partial cycle delay", and a final delay value being one selected from multiples of one cycle is referred to as a "full cycle delay".

In the memory interface training operation, the mode field MODE may store a training mode value TMV indicating one of the MRE(P) training mode, the DWL training mode, the MRD training mode, and the MWD training mode.

The control field MRE(P) may store a training control value TCV_A that is used in the MRE(P) training mode. For example, a phase (i.e., the partial cycle delay) of the receive enable signal generated from the clock signal BCK may be adjusted depending on the training control value TCV_A.

The control field DWL may store a training control value TCV_B that is used in the DWL training mode. For example, a phase (i.e., the partial cycle delay) of the data strobe signal MDQS transmitted from the data buffer 400 may be adjusted depending on the training control value TCV_B.

The control fields MRD1 to MRD3 may store training control values TCV_C to TCV_E that are used in the MRD training mode, respectively. For example, a full cycle delay of the receive enable signal and a phase (i.e., the partial cycle delay) of the data strobe signal MDQS and the data signal MDQ input to the data buffer 400 may be adjusted depending on the training control values TCV_C to TCV_E.

The control fields MWD1 and MWD2 may store training control values TCV_F and TCV_G that are used in the MWD training mode. For example, the full cycle delay of the data strobe signal MDQS transmitted from the data buffer 400 and a phase (i.e., the partial cycle delay) of the data signal MDQ transmitted from the data buffer 400 may be adjusted depending on the training control values TCV_F and TCV_G.

The data field MPR may store expected data ED used in the training operation. For example, an operation of comparing particular data and the expected data ED may be performed in the memory interface training operation.

The data field TSW may store a comparison result CR that is generated in the training operation. For example, in the memory interface training operation, a value corresponding to the comparison result CR of comparing the particular data and the expected data ED may be stored in the data field TSW.

In the interface training operation, the control logic circuit 110 may write values in the corresponding fields of the control register 142 based on the command CMDe and the address ADDRe. In an exemplary embodiment, the training control values TCV_A to TCV_G of the control fields MRE(P), DWL, MRD1 to MRD3, MWD1, and MWD2 may be stored in the initialization operation of FIG. 4 or may be provided from the host controller 3000 in the respective training modes. For example, the first training control value TCV_A may be stored in the initialization operation, and then, the training control value TCV_A may be provided from the host controller 3000 after the initialization operation (e.g., in the MRE(P) training mode).

The training result value generator 143 may generate a training result value based on values written in the fields of the control register 142. For example, in the memory interface training operation, the training result value generator 143 may generate a predetermined training result value depending on the training control values TCV_A to TCV_G of the control fields MERP, DWL, MRD1 to MRD3, MWD1, and MWD2 of the control register 142.

Figure 7:
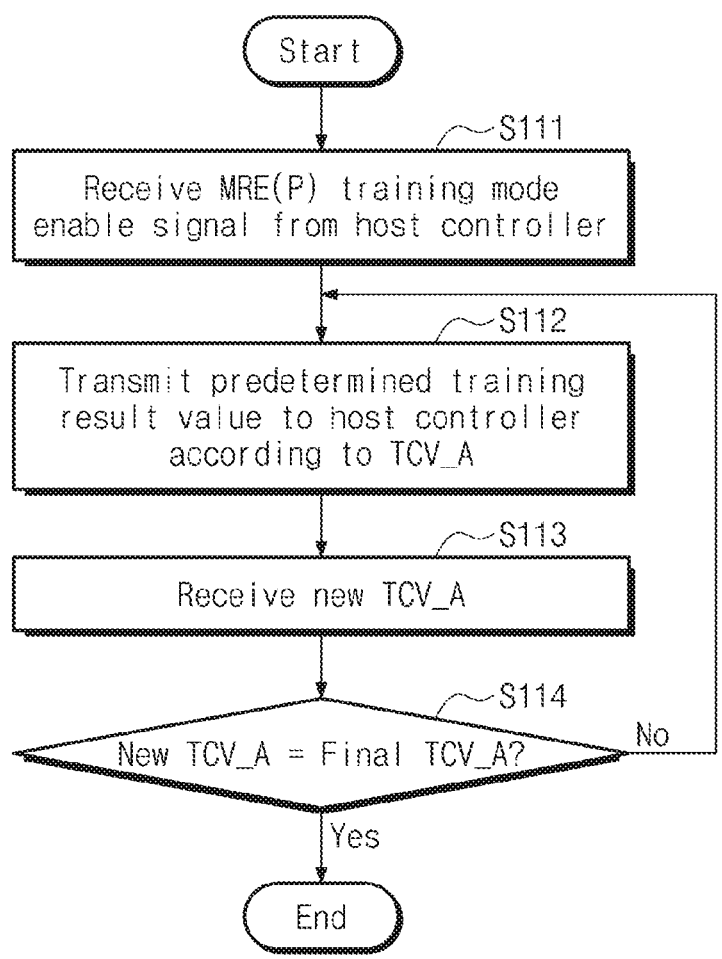
FIG. 7 is a flowchart illustrating an example of an MRE(P) training operation of a memory module of FIG. 2 according to an exemplary embodiment of the inventive concept.

FIG. 7 is a flowchart illustrating an example of an MRE(P) training operation of a memory module of FIG. 2 according to an exemplary embodiment of the inventive concept. Referring to FIGS. 2 and 5 to 7, in operation S111, the memory module 2000 receives an MRE(P) training mode enable signal based on the command CMDe and the address ADDRe from the host controller 3000. For example, in response to the MRE(P) training mode enable signal, the control logic circuit 110 may write the training mode value TMV corresponding to the MRE(P) training mode in the mode field MODE of the control register 142.

In operation S112, the memory module 2000 transmits a predetermined training control value to the host controller 3000 depending on the training control value TCV_A. For example, the training result value generator 143 may generate the predetermined training result value depending on the training control value TCV_A stored in the control field MRE(P) of the control register 142. Here, the training control value TCV_A may correspond to a partial cycle delay value of the receive enable signal generated from the clock signal BCK, and the predetermined training result value may correspond to a value obtained by sampling the clock signal BCK based on the data strobe signal MDQS transmitted from the memory device 500 of FIG. 3. The generated training result value may be transmitted to the host controller 3000 through the buffer register 141.

In operation S113, the memory module 2000 receives a new training control value TCV_A from the host controller 3000. For example, the control logic circuit 110 may write the received new training control value TCV_A in the control field MRE(P) of the control register 142. Accordingly, a value of the control field MRE(P) may vary.

In operation S114, the memory module 2000 determines whether the new training control value TCV_A is a final training control value TCV_A. When the new training control value TCV_A is the final training control value TCV_A, the MRE(P) training operation is terminated. In this case, the control field MRE(P) of the control register 142 may store the final training control value TCV_A. That is, a final partial cycle delay value of the receive enable signal may be set.

When the new training control value TCV_A is not the final training control value TCV_A, the memory module 2000 may again perform operation S112 and operation S113. For example, the memory module 2000 may transmit the predetermined training result value to the host controller 3000 depending on the new training control value TCV_A.

The host controller 3000 may select the final training control value TCV_A based on at least one training result value transmitted from the memory module 2000. For example, when the final training control value TCV_A is selected based on the at least one training result value, in operation S113, the host controller 3000 may transmit the selected final training control value TCV_A to the memory module 2000. When the final training control value TCV_A is not selected based on the at least one training result value, in operation S113, the host controller 3000 may transmit the new training control value TCV_A for receiving a new training result value to the memory module 2000.

Figure 8:
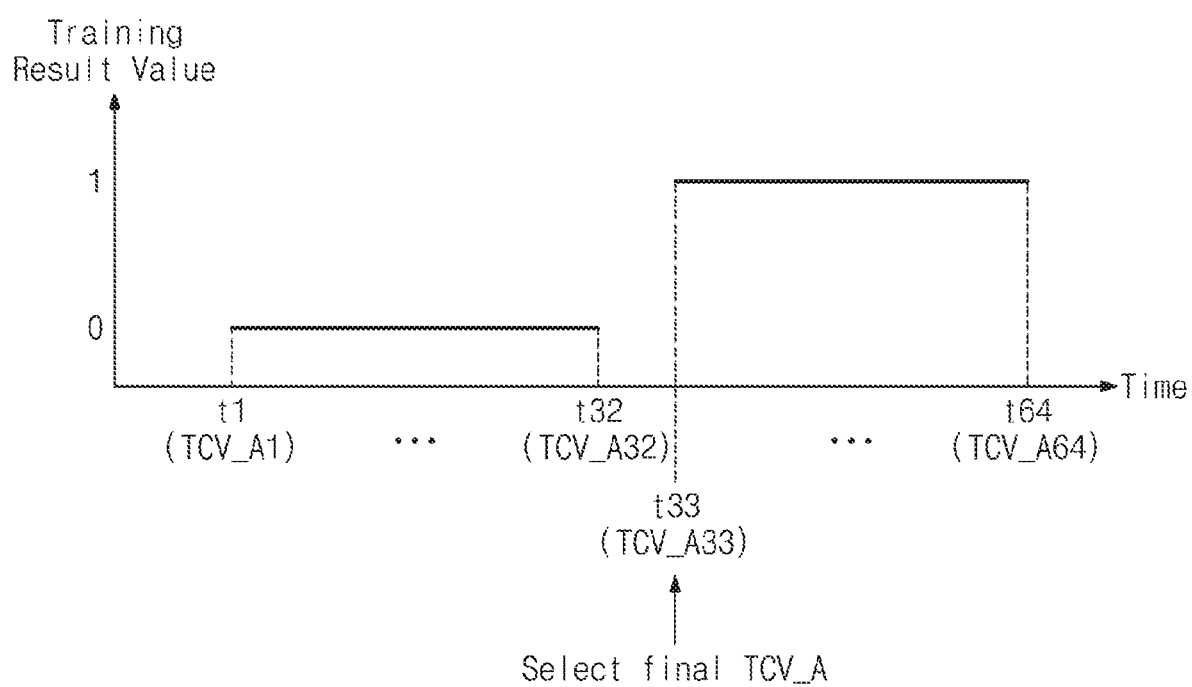
FIG. 8 illustrates an example of an operation of a host controller of FIG. 2 in an MRE(P) training operation according to an exemplary embodiment of the inventive concept.

FIG. 8 illustrates an example of an operation of a host controller of FIG. 2 in an MRE(P) training operation according to an exemplary embodiment of the inventive concept. Referring to FIGS. 2 and 8, the memory module 2000 may perform the MRE(P) training operation based on 1st to 64th training control values TCV_A1 to TCV_A64. For example, when one cycle of the clock signal CK is divided into 64, the 1st to 64th training control values TCV_A1 to TCV_A64 may indicate delay values respectively corresponding to 64 phases. That is, the memory module 2000 may perform the MRE(P) training operation based on the 64 different training control values TCV_A1 to TCV_A64.

The memory module 2000 may transmit a predetermined training control value to the host controller 3000 depending on each training control value. For example, at the 1st to 32nd t1 to t32, the memory module 2000 may transmit "0" as a training result value to the host controller 3000 depending on the 1st to 32nd training control values TCV_A1 to TCV_A32, respectively. At the 33rd to 64th t33 to t64, the memory module 2000 may transmit "1" as a training result value to the host controller 3000 depending on each of the 33rd to 64th training control values TCV_A33 to TCV_A64.

The host controller 3000 may select the final training control value TCV_A based on 64 training result values transmitted from the memory module 2000. For example, the host controller 3000 may select, as the final training control value TCV_A, the 33rd training control value TCV_A33 corresponding to the 33rd time t33 when the training result value transitions from "0" to "1". Afterwards, the host controller 3000 may transmit the 33rd training control value TCV_A33 to the memory module 2000 as the final training control value TCV_A.

As described above, the host controller 3000 may select a final partial cycle delay value of the receive enable signal based on a plurality of training result values transmitted from the memory module 2000. A final partial cycle delay value selecting method described with reference to FIG. 8 is only one example, and the host controller 3000 may select a final partial cycle delay value of the receive enable signal as a method different from the method described with reference to FIG. 8.

Figure 9:
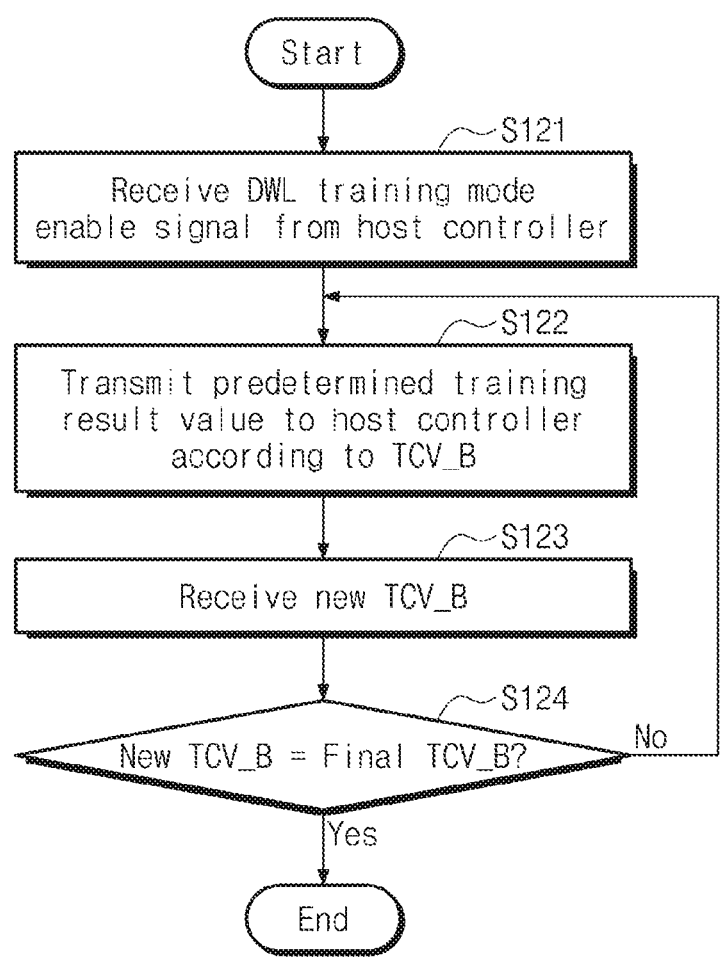
FIG. 9 is a flowchart illustrating an example of a DWL training operation of a memory module of FIG. 2 according to an exemplary embodiment of the inventive concept.

FIG. 9 is a flowchart illustrating an example of a DWL training operation of a memory module of FIG. 2 according to an exemplary embodiment of the inventive concept. Referring to FIGS. 2, 5, 6, and 9, in operation S121, the memory module 2000 receives a DWL training mode enable signal. The DWL training mode enable signal may be based on the command CMDe and the address ADDRe from the host controller 3000. For example, in response to the DWL training mode enable signal, the control logic circuit 110 may write the training mode value TMV corresponding to the DWL training mode in the mode field MODE of the control register 142.

In operation S122, the memory module 2000 transmits a predetermined training result value to the host controller 3000 depending on the training control value TCV_B. For example, the training result value generator 143 may generate the predetermined training result value depending on the training control value TCV_B stored in the control field DWL of the control register 142. Here, the training control value TCV_B may correspond to a partial cycle delay value of the data strobe signal MDQS from the data buffer 400 of FIG. 3, and the predetermined training result value may correspond to a value obtained by sampling the clock signal MCK based on the data strobe signal MDQS. The generated training result value may be transmitted to the host controller 3000 through the buffer register 141.

In operation S123, the memory module 2000 receives a new training control value TCV_B. For example, the control logic circuit 110 may write the received new training control value TCV_B in the control field DWL of the control register 142. Accordingly, a value of the control field DWL may vary.

In operation S124, the memory module 2000 determines whether the new training control value TCV_B is a final training control value TCV_B. When the new training control value TCV_B is the final training control value TCV_B, the DWL training operation is terminated. In this case, the control field DWL of the control register 142 may store the final training control value TCV_B. That is, a final partial cycle delay value of the data strobe signal MDQS transmitted from the data buffer 400 of FIG. 3 may be selected. When the new training control value TCV_B is not the final training control value TCV_B, the memory module 2000 may again perform operation S122 and operation S123.

The host controller 3000 may select the final training control value TCV_B based on at least one training result value transmitted from the memory module 2000. For example, the host controller 3000 may select the final training control value TCV_B in a method that is similar to the final training control value (TCV_A) selecting method described with reference to FIG. 8.

Figure 10:
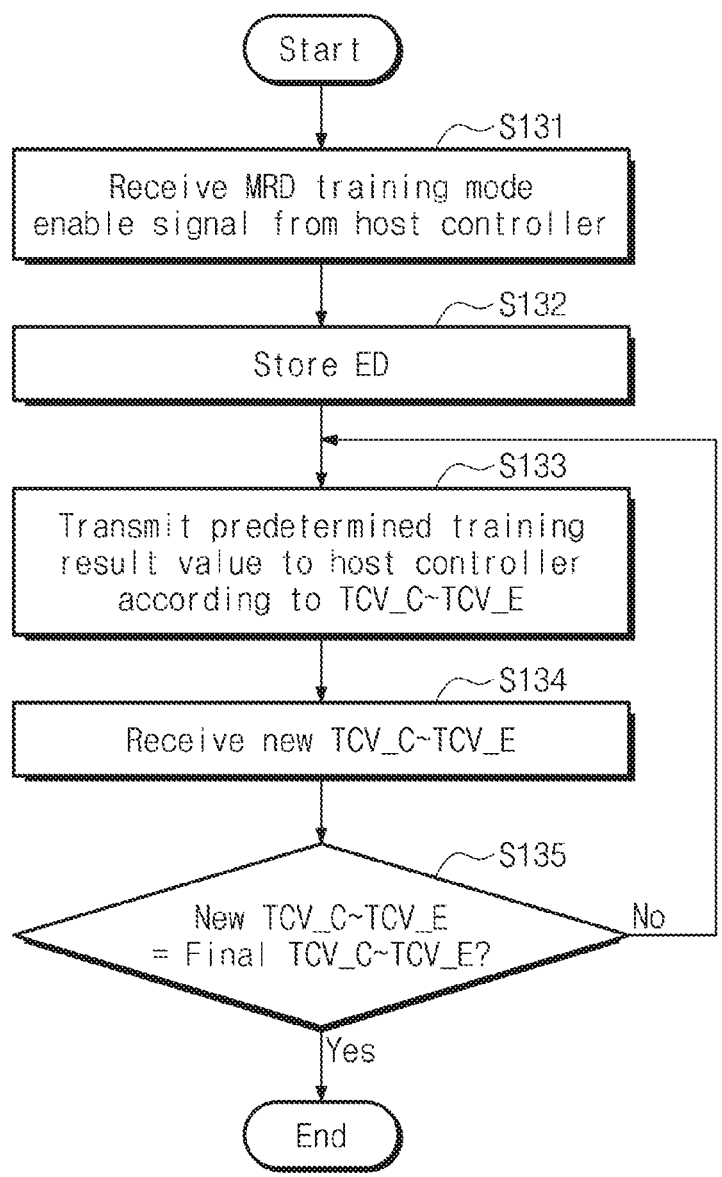
FIG. 10 is a flowchart illustrating an example in which a memory module of FIG. 2 performs an MRD training operation.

FIG. 10 is a flowchart illustrating an example in which a memory module of FIG. 2 performs an MRD training operation according to an exemplary embodiment of the inventive concept. Referring to FIGS. 2, 5, 6, and 10, in operation S131, the memory module 2000 receives an MRD training mode enable signal from the host controller 3000. The MRD training mode enable signal may be based on the command CMDe and the address ADDRe from the host controller 3000. For example, in response to the MRD training mode enable signal, the control logic circuit 110 may write the training mode value TMV corresponding to the MRD training mode in the mode field MODE of the control register 142.

In operation S132, the memory module 2000 stores the expected data ED from the host controller 3000. For example, the host controller 3000 may direct a buffer control words (BCW) register (not illustrated) of the data buffer 400 of FIG. 3 to store the expected data ED. Accordingly, the control logic circuit 110 may store the expected data ED in the data field MPR of the control register 142 corresponding to the BCW register. In this case, the expected data ED may be the same data as particular data stored in advance in each of the memory devices 210 to 2n0.

In operation S133, the memory module 2000 transmits a predetermined training result value to the host controller 3000 depending on the training control values TCV_C to TCV_E. For example, the training result value generator 143 may generate the predetermined training result value depending on the training control values TCV_C to TCV_E stored in the control fields MRD1 to MRD3 of the control register 142. Here, the training control values TCV_C to TCV_E may respectively correspond to a full cycle delay, a partial cycle delay, and a partial cycle delay of the receive enable signal, the data strobe signal MDQS, and the data signal MDQ, which are used to read particular data from the memory device 500. Also, the predetermined training result value may correspond to a comparison result of comparing expected data ED stored in advance in the BCW register of the data buffer 400 of FIG. 3 and the particular data read from the memory device 500.

The predetermined training result value may be a first value (e.g., "1") indicating that two data are matched or a second value (e.g., "0") indicating that two data are different. For example, the training result value generator 143 may generate the predetermined training result value so as to have the first value regardless of the training control values TCV_C to TCV_E. In another example, in the case where particular training control values TCV_C to TCV_E are stored in the control fields MRD1 to MRD3, the training result value generator 143 may generate the predetermined training result value corresponding to the first value. The training result value generator 143 may store the generated training result value in the data field TSW of the control register 142 as the comparison result CR. The training result value stored in the control register 142 may be transmitted to the host controller 3000 through the buffer register 141.

In operation S134, the memory module 2000 receives new training control values TCV_C to TCV_E. For example, the control logic circuit 110 may write the new training control values TCV_C to TCV_E in the control fields MRD1 to MRD3 of the control register 142. Accordingly, values of the control fields MRD1 to MRD3 may vary.

In operation S135, the memory module 2000 may determine whether the new training control values TCV_C to TCV_E are final training control values TCV_C to TCV_E. When the new training control values TCV_C to TCV_E are the final training control values TCV_C to TCV_E, the MRD training operation is terminated. In this case, the control fields MRD1 to MRD3 of the control register 142 may store the final training control values TCV_C to TCV_E. That is, a final full cycle delay value of the receive enable signal and a final partial cycle delay value of the data strobe signal MDQS and the data signal MDQ input to the data buffer 400 of FIG. 3 may be set. When the new training control values TCV_C to TCV_E are not the final training control values TCV_C to TCV_E, the memory module 2000 may again perform operation S133 and operation S134.

The host controller 3000 may select the final training control values TCV_C to TCV_E based on at least one training result value transmitted from the memory module 2000. For example, in the case where a training result value is the first value, the host controller 3000 may select the corresponding training control values TCV_C to TCV_E as the final training control values TCV_C to TCV_E. In another example, in the case where each of training result values corresponding to various combinations of the training control values TCV_C to TCV_E is the first value, the host controller 3000 may select one of the various combinations of the training control values TCV_C to TCV_E as the final training control values TCV_C to TCV_E.

Figure 11:
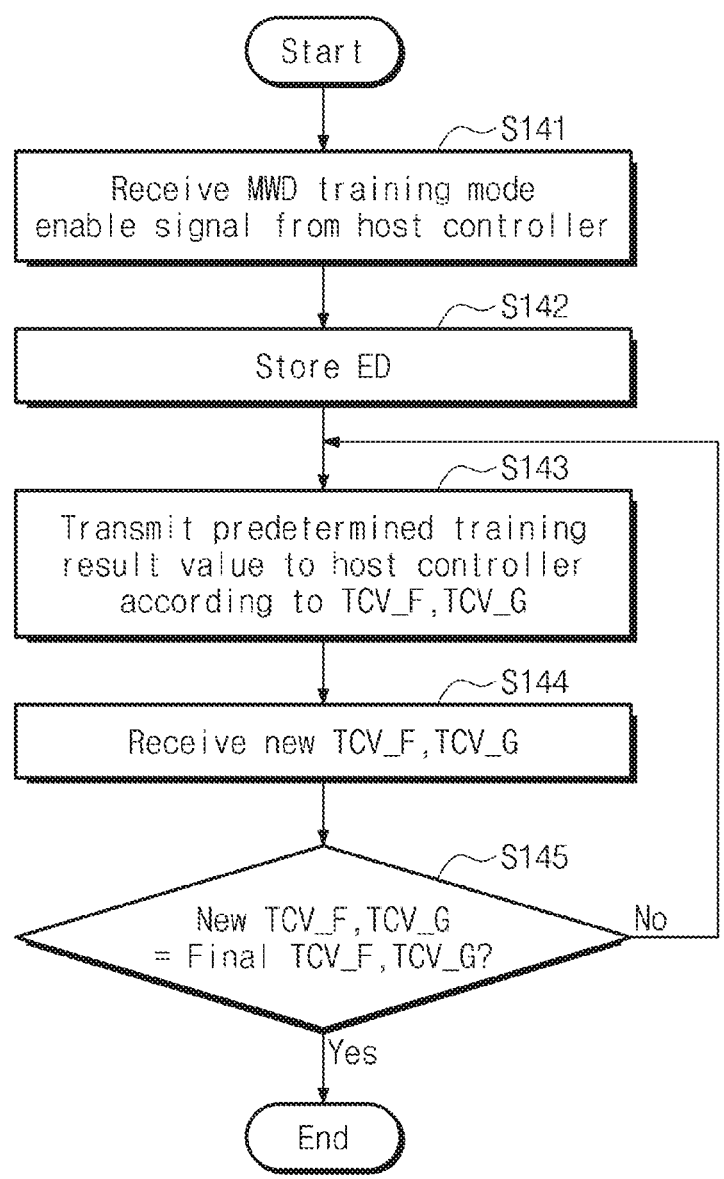
FIG. 11 is a flowchart illustrating an example in which a memory module of FIG. 2 performs an MWD training operation according to an exemplary embodiment of the inventive concept.

FIG. 11 is a flowchart illustrating an example in which a memory module of FIG. 2 performs an MWD training operation according to an exemplary embodiment of the inventive concept. Referring to FIGS. 2, 5, 6, and 11, in operation S141, the memory module 2000 receives an MWD training mode enable signal from the host controller 3000. The MWD training mode enable signal may be based on the command CMDe and the address ADDRe from the host controller 3000. For example, in response to the MWD training mode enable signal, the control logic circuit 110 may write the training mode value TMV corresponding to the MWD training mode in the mode field MODE of the control register 142.

In operation S142, the memory module 2000 stores the expected data ED from the host controller 3000. For example, the host controller 3000 may direct the BCW register of the data buffer 400 of FIG. 3 to store the expected data ED. Accordingly, the control logic circuit 110 may store the expected data ED in the data field MPR of the control register 142 corresponding to the BCW register.

In operation S143, the memory module 2000 transmits a predetermined training result value to the host controller 3000 depending on the training control values TCV_F and TCV_G. For example, the training result value generator 143 may generate the predetermined training result value depending on the training control values TCV_F and TCV_G stored in the control fields MWD1 and MWD2 of the control register 142. Here, the training control values TCV_F and TCV_G may respectively correspond to a full cycle delay and a partial cycle delay of the data strobe signal MDQS and the data signal MDQ, which are used to write particular data in the memory device 500. The predetermined training result value may correspond to a comparison result of comparing expected data ED stored in advance in the BCW register of the data buffer 400 of FIG. 3 and the particular data read from the memory device 500. The particular data read from the memory device 500 may be data output from the memory device 500 after expected data ED are written in the memory device 500.

The predetermined training result value may be a first value (e.g., "1") indicating that two data are matched or a second value (e.g., "0") indicating that two data are different. For example, the training result value generator 143 may generate the predetermined training result value so as to have the first value regardless of the training control values TCV_F and TCV_G. In another example, in the case where particular training control values TCV_F and TCV_G are stored in the control fields MWD1 and MWD2, the training result value generator 143 may generate the predetermined training result value corresponding to the first value. The training result value generator 143 may store the generated training result value in the data field TSW of the control register 142 as the comparison result CR. The training result value stored in the control register 142 may be transmitted to the host controller 3000 through the buffer register 141.

In operation S144, the memory module 2000 receives new training control values TCV_F and TCV_G. For example, the control logic circuit 110 may write the received new training control values TCV_F and TCV_G in the control fields MWD1 and MWD2 of the control register 142. Accordingly, values of the control fields MWD1 and MWD2 may vary.

In operation S145, the memory module 2000 determines whether the new training control values TCV_F and TCV_G are final training control values TCV_F and TCV_G. When the new training control values TCV_F and TCV_G are the final training control values TCV_F and TCV_G, the MWD training operation is terminated. In this case, the control fields MWD1 and MWD2 of the control register 142 may store the final training control values TCV_F and TCV_G. That is, there may be set a final full cycle delay value and a final partial cycle delay value of the data strobe signal MDQS and the data signal MDQ transmitted from the data buffer 400 of FIG. 3. When the new training control values TCV_F and TCV_G are not the final training control values TCV_F and TCV_G, the memory module 2000 may again perform operation S143 and operation S144.

The host controller 3000 may select the final training control values TCV_F and TCV_G based on at least one training result value transmitted from the memory module 2000. The host controller 3000 may select the final training control values TCV_F and TCV_G as described in the MRD training operation of FIG. 10.

As described above, in the memory interface training operation, the memory module 2000 may replicate the training operation by generating a predetermined training result value depending on a training control value in various training modes.

Below, the host interface training operation of the memory module 2000 will be more fully described with reference to FIGS. 12 to 15.

Figure 12:
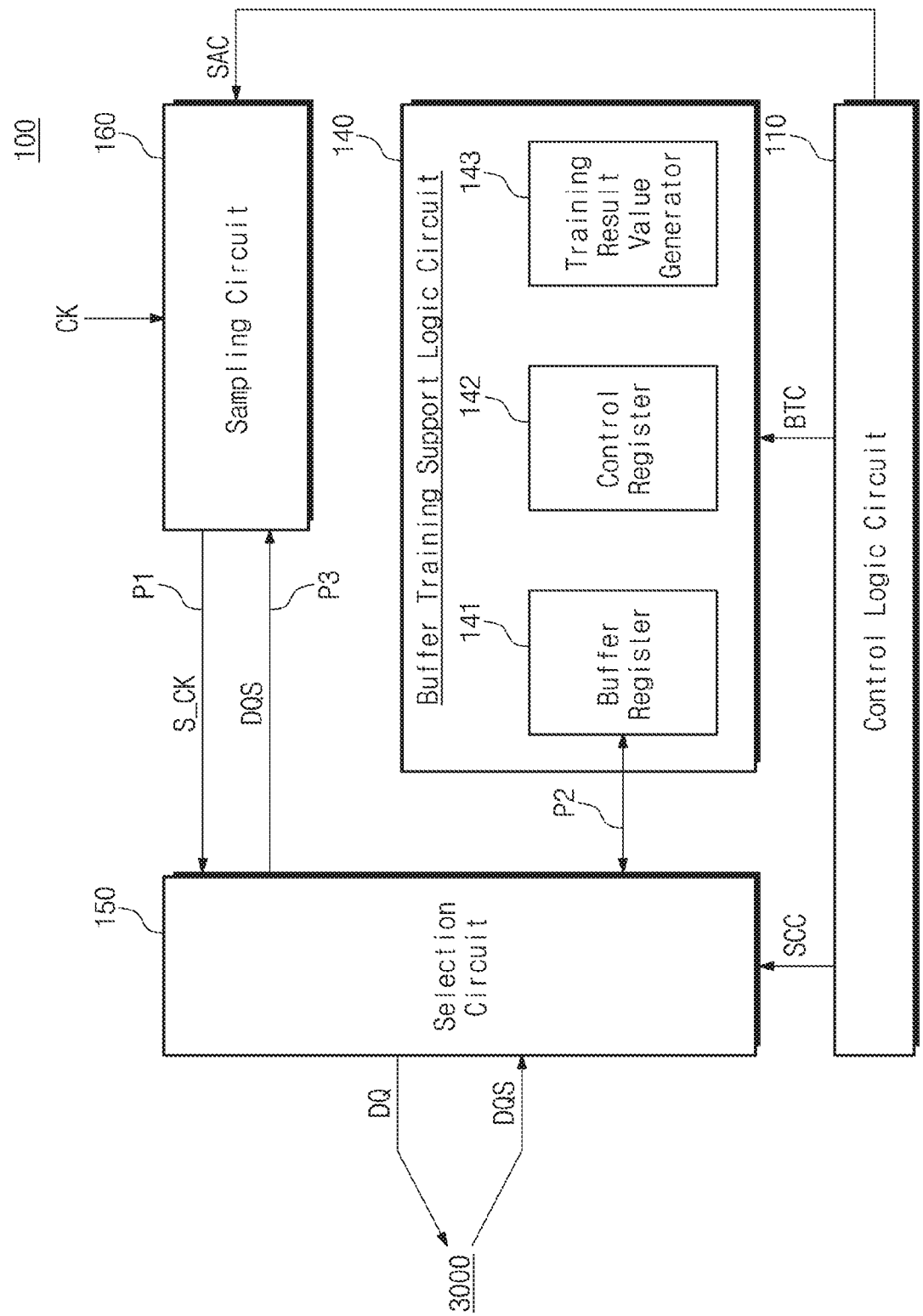
FIG. 12 is a block diagram illustrating an example of a device controller of FIG. 2 for performing a host interface training operation according to an exemplary embodiment of the inventive concept.

FIG. 12 is a block diagram illustrating an example of a device controller of FIG. 2 for performing a host interface training operation. A mode (hereinafter referred to as an "HWL training mode"), in which write leveling is trained, from among various training modes of the host interface training operation may be performed based on the device controller 100 of FIG. 12. In the HWL training mode, a delay value of the data strobe signal DQS from the host controller 3000 may be adjusted.

The device controller 100 of FIG. 12 further includes a sampling circuit 160 compared with the device controller 100 of FIG. 5 and may operate to be similar to the device controller 100 of FIG. 5, and thus, additional description will be omitted to avoid redundancy.

Referring to FIG. 12, in the HWL training mode, the control logic circuit 110 includes the buffer training support logic circuit 140, the selection circuit 150, and the sampling circuit 160. For example, through a control signal BTC, the control logic circuit 110 may write the training mode value TMV corresponding to the HWL training mode in the mode field MODE of the control register 142.

The selection circuit 150 may receive the data strobe signal DQS having a particular delay value from the host controller 3000. The selection circuit 150 may transfer the data strobe signal DQS to a third data path P3 based on the control signal SCC from the control logic circuit 110. The data strobe signal DQS transferred through the third data path P3 may be provided to the sampling circuit 160. The sampling circuit 160 may sample the clock signal CK based on the data strobe signal DQS. The sampling circuit 160 may operate based on a control signal SAC from the control logic circuit 110. The sampling circuit 160 may provide a sampled clock signal S_CK to the selection circuit 150 through the first data path P1. The selection circuit 150 may transmit the sampled clock signal S_CK to the host controller 3000 through the data signal DQ.

The host controller 3000 may select a final delay value of the data strobe signal DQS based on the sampled clock signal S_CK. For example, the host controller 3000 may select a final delay value of the data strobe signal DQS as described with reference to FIG. 8. That is, a final delay value of the data strobe signal DQS transmitted from the host controller 3000 may be set depending on the HWL training mode.

In the case where it is impossible to select a final delay value, the host controller 3000 may change a delay value and may transmit the data strobe signal DQS having another delay value to the device controller 100. As such, the device controller 100 may sample the clock signal CK based on the data strobe signal DQS having another delay value and may transmit the sampled clock signal S_CK to the host controller 3000.

An example is illustrated in FIG. 12, the sampling circuit 160 is located outside the buffer training support logic circuit 140, but the inventive concept is not limited thereto. In another embodiment, the sampling circuit 160 is located within the buffer training support logic circuit 140. In this case, the control logic circuit 110 may control the selection circuit 150 such that the data strobe signal DQS is transferred to the buffer training support logic circuit 140.

Figure 13:
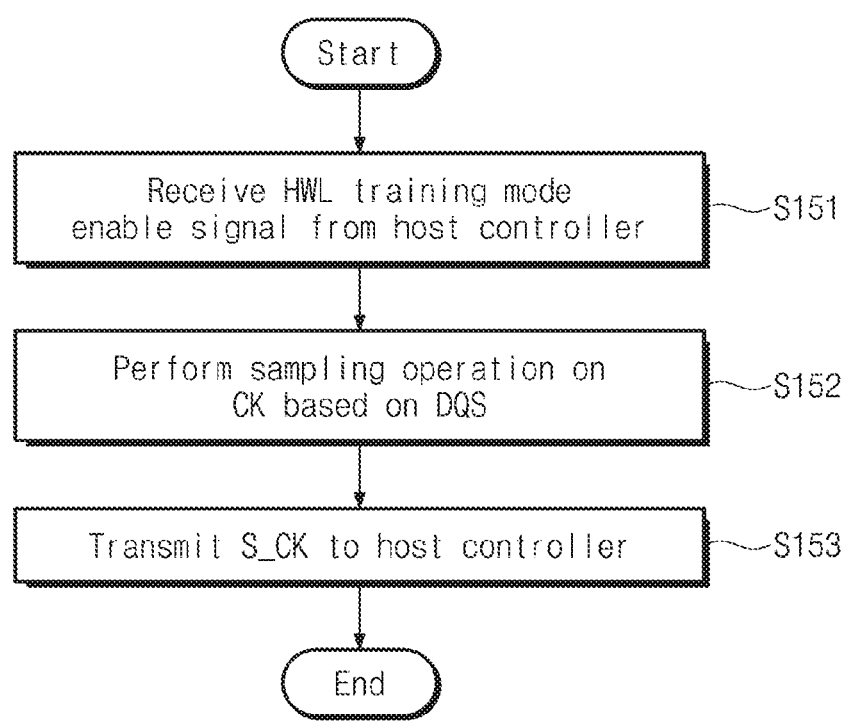
FIG. 13 is a flowchart illustrating an example in which a memory module of FIG. 2 performs an HWL training operation according to an exemplary embodiment of the inventive concept.

FIG. 13 is a flowchart illustrating an example in which a memory module of FIG. 2 performs an HWL training operation according to an exemplary embodiment of the inventive concept. Referring to FIGS. 2, 12, and 13, in operation S151, the memory module 2000 receives an HWL training mode enable signal from the host controller 3000. In operation S152, the memory module 2000 performs a sampling operation on a clock signal CK based on a data strobe signal DQS transmitted from the host controller 3000. In operation S153, the memory module 2000 transmits the sampled clock signal S_CK to the host controller 3000.

In the case where a normal operation or any other training operation is performed after a final delay value of the data strobe signal DQS is selected by the host controller 3000, the HWL training operation is terminated. In the case where a final delay value of the data strobe signal DQS is not selected by the host controller 3000, operation S152 and operation S153 may be repeatedly performed until the final delay value is selected.

Figure 14:
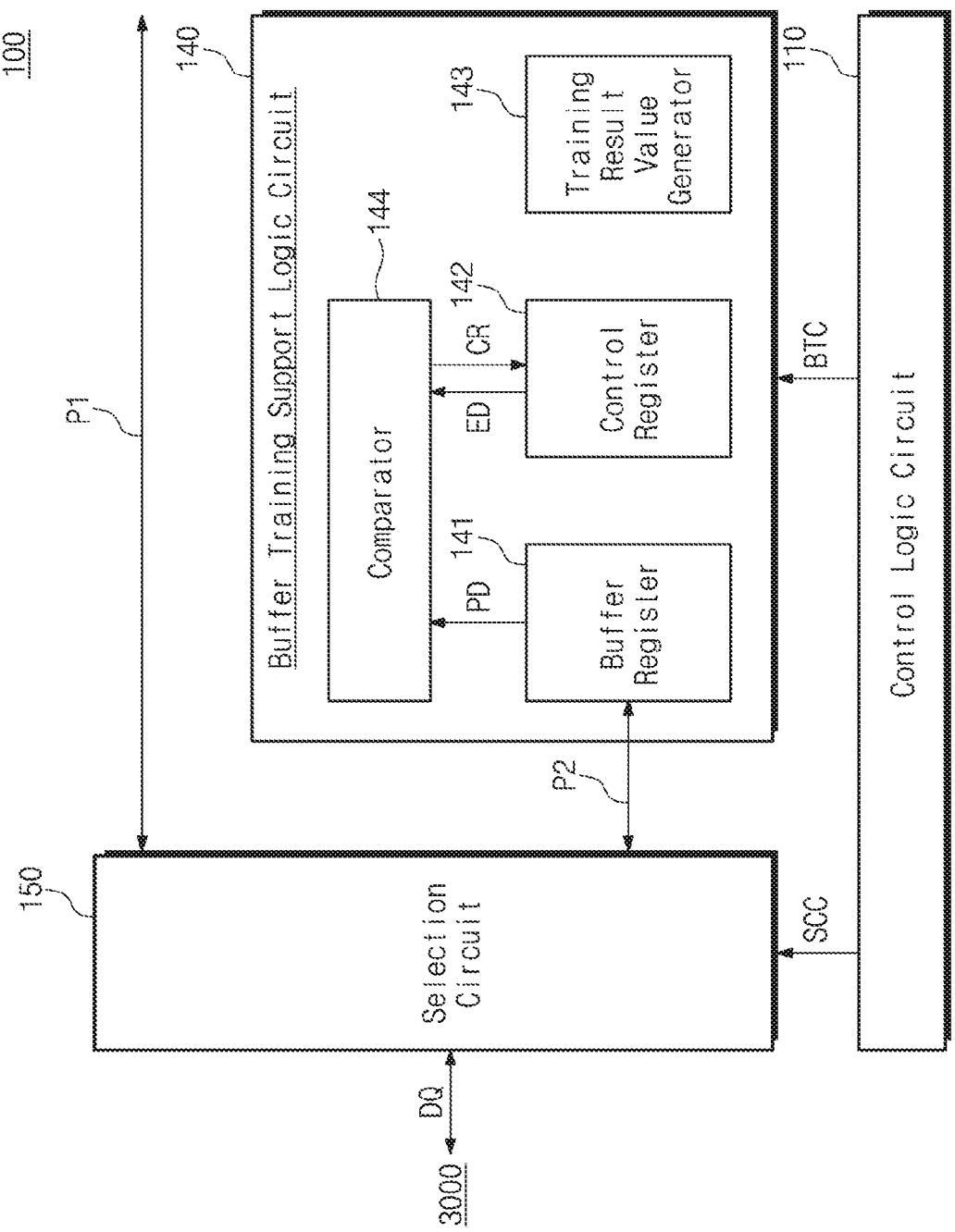
FIG. 14 is a block diagram illustrating an example of a device controller of FIG. 2 for performing a host interface training operation according to an exemplary embodiment of the inventive concept.

FIG. 14 is a block diagram illustrating an example of a device controller of FIG. 2 for performing a host interface training operation according to an exemplary embodiment of the inventive concept. A mode (hereinafter referred to as an "HIW training mode"), in which a write delay is trained, from among various training modes of the host interface training operation may be performed based on the device controller 100 of FIG. 14. In the HIW training mode, a delay value of the data signal DQ from the host controller 3000 may be adjusted. The device controller 100 of FIG. 14 further includes a comparator 144 (e.g., a comparison circuit) in the buffer training support logic circuit 140 compared with the device controller 100 of FIG. 5 and may operate to be similar to the device controller 100 of FIG. 5, and thus, additional description will be omitted to avoid redundancy.

Referring to FIG. 14, in the HIW training mode, the control logic circuit 110 may control the buffer training support logic circuit 140 and the selection circuit 150. For example, through the control signal BTC, the control logic circuit 110 may write the training mode value TMV corresponding to the HIW training mode in the mode field MODE of the control register 142.

The control logic circuit 110 may write the expected data ED in the data field MPR of the control register 142. The expected data ED may be provided from the host controller 3000 through the command CMDe and the address ADDRe. The control logic circuit 110 may control the selection circuit 150 such that particular data PD identical to the expected data ED is written in the buffer register 141. The particular data PD may be provided from the host controller 3000 through the data signal DQ. In this case, the data signal DQ may have a phase corresponding to a delay value set by the host controller 3000.

The selection circuit 150 may receive the data signal DQ from the host controller 3000. The selection circuit 150 may transfer the data signal DQ to the second data path P2 based on the control signal SCC from the control logic circuit 110. The data signal DQ transferred through the second data path P2 may be provided to the buffer register 141. Accordingly, the buffer register 141 may store particular data PD.

The comparator 144 may compare the particular data PD stored in the buffer register 141 and the expected data ED stored in the control register 142 to generate a comparison result CR. The comparator 144 may store the comparison result CR in the data field TSW of the control register 142. For example, in the case where the particular data PD and the expected data ED are matched, the comparator 144 may generate a first value (e.g., "1") as the comparison result CR. In the case where the particular data PD and the expected data ED are different, the comparator 144 may generate a second value (e.g., "0") as the comparison result CR.

Even though the particular data PD and the expected data ED having the same value are provided from the host controller 3000, a value of the particular data PD stored in the buffer register 141 may vary depending on a phase difference between the data signal DQ and the data strobe signal DQS. In the case where a final delay value of the data strobe signal DQS is set through the HWL training operation, a value of the particular data PD stored in the buffer register 141 may vary depending on a delay value of the data signal DQ. Accordingly, the comparator 144 may generate the first value or the second value as the comparison result CR depending on the delay value of the data signal DQ.

The comparison result CR stored in the control register 142 may be transmitted to the host controller 3000 through the buffer register 141. In this case, the selection circuit 150 may provide the host controller 3000 with the data signal DQ provided through the second data path P2 based on the control signal SCC.

The host controller 3000 may select a final delay value of the data signal DQ based on the comparison result CR. The host controller 3000 may select a final delay value as described in the MRD training operation of FIG. 10.

In the case where it is impossible to select a final delay value, the host controller 3000 may change a delay value and may transmit the data signal DQ (i.e., the particular data PD) having another delay value (i.e., another phase) to the device controller 100. Accordingly, the device controller 100 may generate the comparison result CR based on the data signal DQ having another delay value and may transmit the generated comparison result CR to the host controller 3000.

Figure 15:
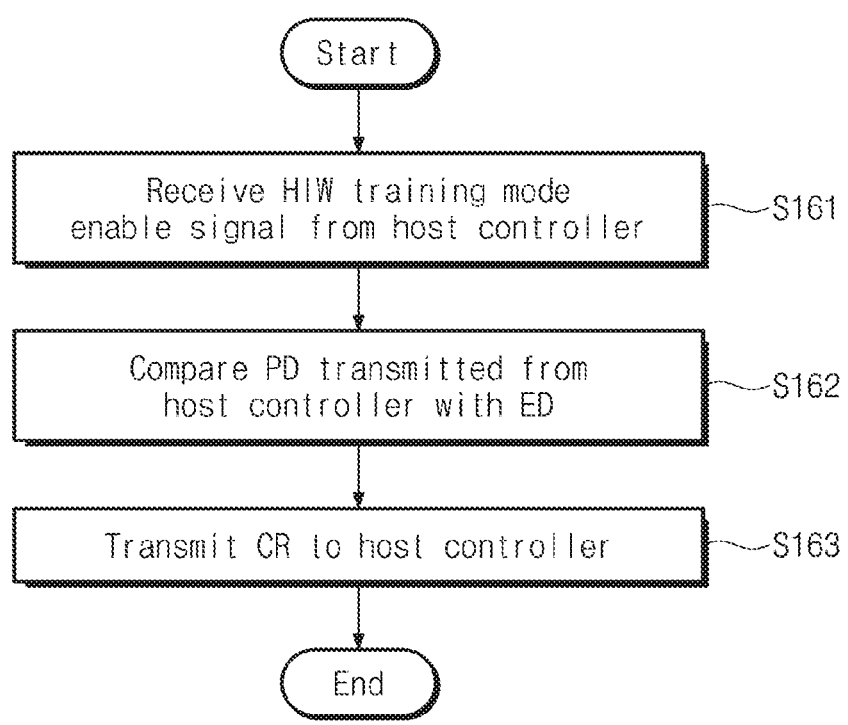
FIG. 15 is a flowchart illustrating an example in which a memory module of FIG. 2 performs an HIW training operation according to an exemplary embodiment of the inventive concept.

FIG. 15 is a flowchart illustrating an example in which a memory module of FIG. 2 performs an HIW training operation according to an exemplary embodiment of the disclosure. Referring to FIGS. 2, 14, and 15, in operation S161, the memory module 2000 receives an HIW training mode enable signal from the host controller 3000. In operation S162, the memory module 2000 compares the particular data PD transmitted from the host controller 3000 with the expected data ED to generate a comparison result. Here, the particular data PD may be transmitted from the host controller 3000 through the data signal DQ, and the expected data ED may be transmitted from the host controller 3000 through the command CMDe and the address ADDRe. In operation S163, the memory module 2000 transmits the comparison result CR to the host controller 3000.

In the case where a normal operation or any other training operation is performed after a final delay value of the data signal DQ is selected by the host controller 3000, the HIW training operation may be terminated. In the case where a final delay value of the data signal DQ is not selected by the host controller 3000, operation S162 and operation S163 may be repeatedly performed until the final delay value is selected.

As described above, the memory module 2000 may perform an actual training operation for the host interface training operation. A final delay value of the data signal DQ and the data strobe signal DQS may be set based on a value generated through the actual training operation. Accordingly, in a normal operation of a first operation mode, the host controller 3000 may transmit the data signal DQ and the data strobe signal DQS having the set final delay value to the memory module 2000.

As described above, the description is given with respect to training operations being performed based on the expected data ED stored in the data field MPR, but the inventive concept is not limited thereto. In another embodiment, the expected data ED may be generated from a particular register (e.g., a linear feedback shift register (LFSR)) in the device controller 100. Training operations including a data comparison operation may be performed on the expected data ED generated from the particular register.

A memory module according to at least one embodiment of the inventive concept may operate as an LRDIMM type without including a data buffer. Because the memory module according to the inventive concept does not include a data buffer, the number of memory devices to be included in the memory module may increase. Also, a read latency and a write latency may decrease.

While the inventive concept has been described with reference to exemplary embodiments thereof, it will be apparent to those of ordinary skill in the art that various changes and modifications may be made thereto without departing from the spirit and scope of the inventive concept.

What is claimed is:

1. A memory module comprising:
    a device controller configured to communicate with a host device based on a first interface including a first clock signal, a first data signal, and a first data strobe signal and to operate in one of a first operation mode or a second operation mode depending on an operation mode control value from the host device; and
    a memory device configured to communicate with the device controller based on a second interface including a second data signal and a second data strobe signal,
    wherein the device controller comprises a first logic circuit configured to transmit a predetermined training result value to the host device depending on a training control value from the host device, when training is performed on a third interface being a virtual interface recognized by the host device in the first operation mode.

2. The memory module of claim 1, wherein the third interface is a virtual interface between the memory device and a virtual data buffer which is recognized by the host device as being included in the memory module.

3. The memory module of claim 2, wherein the first logic circuit comprises:
    a control register configured to store the training control value from the host device; and
    a training result value generator configured to generate the predetermined training result value depending on the stored training control value.

4. The memory module of claim 3, wherein, when a phase of a received enable signal of the third interface is trained by the host device, the training result value generator generates a first training result value depending on a first training control value corresponding to a delay value of the receive enable signal generated from an operation clock signal of the virtual data buffer, and the control register stores a final delay value of the received enable signal selected by the host device based on the first training result value.

5. The memory module of claim 3, wherein, when write leveling of the third interface is trained by the host device, the training result value generator generates a second training result value depending on a second training control value corresponding to a delay value of a third data strobe signal transmitted from the virtual data buffer, and the control register stores a final delay value of the third data strobe signal selected by the host device based on the second training result value.

6. The memory module of claim 3, wherein, when a read delay of the third interface is trained by the host device, the training result value generator generates a third training result value depending on a third training control value corresponding to a delay value of a third data signal received by the virtual data buffer and a fourth training control value corresponding to a delay value of a fourth data strobe signal received by the virtual data buffer, and the control register stores a final delay value of the third data signal and a final delay value of the fourth data strobe signal, which are selected by the host device based on the third training result value.

7. The memory module of claim 3, wherein, when a write delay of the third interface is trained by the host device, the training result value generator generates a fourth training result value depending on a fifth training control value corresponding to a delay value of a fourth data signal transmitted from the virtual data buffer, and the control register stores a final delay value of the fourth data signal selected by the host device based on the fourth training result value.

8. The memory module of claim 3, wherein, when a write delay of the first interface is trained by the host device in the first operation mode, the first logic circuit further comprises:
    a buffer register configured to store particular data depending on a second write operation; and
    a comparator configured to compare the particular data stored in the buffer register with expected data to generate a comparison result,
    wherein a final delay value of the first data signal is selected by the host device based on the comparison result.

9. The memory module of claim 1, wherein the device controller further comprises:
    a sampling circuit configured to sample the first clock signal based on the first data strobe signal, when a write leveling phase of the first interface is trained by the host device in the first operation mode,
    wherein a final delay value of the first data strobe signal is selected by the host device based on the sampled first clock signal.

10. The memory module of claim 1, wherein the memory module is recognized as a load reduced dual in-line memory module (LRDIMM) by the host device in the first operation mode, and
    wherein the memory module is recognized as a registered dual in-line memory module (RDIMM) by the host device in the second operation mode.

11. The memory module of claim 1, wherein the device controller further comprises:
    a second logic circuit configured to perform a training operation on the second interface; and
    an interface register configured to store a final delay value of the second interface selected depending on the training operation for the second interface.

12. An operating method of a memory module comprising a device controller and a memory device, the method comprising:
    performing an initialization operation in one of a first operation mode or a second operation mode depending on an operation mode control value from a host device;
    receiving, from the host device, a training mode enable signal for training a virtual interface between the memory device and a virtual data buffer recognized by the host device as being included in the memory module, after the initialization operation is performed in the first operation mode;
    receiving a training control value corresponding to a delay value of the virtual interface from the host device, after the training mode enable signal is received; and
    transmitting a predetermined training result value to the host device depending on the received training control value.

13. The method of claim 12, wherein the training mode enable signal includes a first training mode enable signal for training a phase of a receive enable signal of the virtual interface, and
    wherein the training control value includes a first training control value corresponding to a delay value of the receive enable signal generated from an operation clock signal of the virtual data buffer.

14. The method of claim 12, wherein the training mode enable signal includes a second training mode enable signal for training a write leveling of the virtual interface, and
wherein the training control value includes a second training control value corresponding to a delay value of a first data strobe signal transmitted from the virtual data buffer.

15. The method of claim 12, wherein the training mode enable signal includes a third training mode enable signal for training a read delay of the virtual interface, and
wherein the training control value includes a third training control value corresponding to a delay value of a first data signal received by the virtual data buffer and a fourth training control value corresponding to a delay value of a second data strobe signal received by the virtual data buffer.

16. The method of claim 12, wherein the training mode enable signal includes a fourth training mode enable signal for training a write delay of the virtual interface, and
wherein the training control value includes a fifth training control value corresponding to a delay value of a second data signal transmitted from the virtual data buffer.

17. The method of claim 12, further comprising:
receiving a fifth training mode enable signal for training a write leveling of a host interface between the host device and the device controller from the host device, after the initialization operation is performed in the first operation mode;
sampling an operation clock signal of the device controller based on a third data strobe signal transmitted from the host device, after the fifth training mode enable signal is received; and
transmitting the sampled operation clock signal to the host device.

18. The method of claim 12, further comprising:
receiving a sixth training mode enable signal for training a write delay of a host interface between the host device and the device controller from the host device, after the initialization operation is performed in the first operation mode;
comparing particular data transmitted from the host device with expected data to generate a comparison result, after the sixth training mode enable signal is received; and
transmitting the comparison result to the host device.

19. A memory module comprising:
a device controller configured to communicate with a host device based on a first interface; and
a memory device configured to communicate with the device controller based on a second interface,
wherein, when a first training operation is performed on the first interface by the host device, the device controller transmits a training result value obtained depending on the first training operation to the host device, and
wherein, when a second training operation is performed on a third interface being a virtual interface by the host device, the device controller transmits a predetermined training result value to the host device.

20. The memory module of claim 19, wherein the device controller is further configured to:
perform a third training operation on the second interface; and
communicate with the memory device based on a delay value of the second interface selected depending on the third training operation.

* * * * *